(12) United States Patent
Shakespeare et al.

(10) Patent No.: US 10,020,540 B2
(45) Date of Patent: Jul. 10, 2018

(54) THIN FILM BATTERIES COMPRISING A GLASS OR CERAMIC SUBSTRATE

(71) Applicant: CYMBET CORPORATION, Elk River, MN (US)

(72) Inventors: Stuart Kevin Shakespeare, Mayer, MN (US); Stanley Jacob Stanislowski, Elk River, MN (US); Matthew E. Flatland, Elk River, MN (US); Stephen W. Downey, Elk River, MN (US); Morgan J. Thoma, Osseo, MN (US)

(73) Assignee: CYMBET CORPORATION, Elk River, MN (US)

( * ) Notice: Subject to any disclaimer, the term of this patent is extended or adjusted under 35 U.S.C. 154(b) by 0 days.

(21) Appl. No.: 14/434,700

(22) PCT Filed: Oct. 15, 2013

(86) PCT No.: PCT/US2013/065045
§ 371 (c)(1),
(2) Date: Apr. 9, 2015

(87) PCT Pub. No.: WO2014/062676
PCT Pub. Date: Apr. 24, 2014

(65) Prior Publication Data
US 2015/0280284 A1     Oct. 1, 2015

Related U.S. Application Data

(60) Provisional application No. 61/714,004, filed on Oct. 15, 2012.

(51) Int. Cl.
*H01M 2/10* (2006.01)
*H01M 10/0585* (2010.01)
(Continued)

(52) U.S. Cl.
CPC ......... *H01M 10/0585* (2013.01); *H01M 2/10* (2013.01); *H01M 4/0471* (2013.01);
(Continued)

(58) Field of Classification Search
CPC .... H01M 2/10; H01M 4/0471; H01M 4/1391; H01M 4/1397; H01M 4/505;
(Continued)

(56) References Cited

U.S. PATENT DOCUMENTS

| 4,218,230 A | 8/1980 | Hogan |
| 5,314,765 A | 5/1994 | Bates |

(Continued)

OTHER PUBLICATIONS

Extended European Search Report for counterpart European Application No. 13847712.0, dated May 2, 2016 (9 pages).

*Primary Examiner* — Brittany Raymond
(74) *Attorney, Agent, or Firm* — Kagan Binder, PLLC

(57) ABSTRACT

A thin film battery comprises a glass or ceramic substrate having a coefficient of thermal expansion ("CTE") of from about 7 to about 10 ppm/° K, a continuous metal or metal oxide cathode current collector and having a thickness of less than about 3 micrometers, the cathode current collector being superjacent to the glass or ceramic substrate, a cathode material layer comprising lithium transition metal oxides that is a continuous film having a thickness of from about 10 to about 80 micrometers, the cathode material layer being superjacent to the cathode current collector, a LiPON electrolyte layer superjacent to the cathode material layer and having a thickness of from about 0.5 to about 4 micrometers, and an anode current collector with an optional anode material. Methods of making and using the batteries are described.

20 Claims, 4 Drawing Sheets

(51) Int. Cl.
*H01M 4/04* (2006.01)
*H01M 4/1391* (2010.01)
*H01M 4/1397* (2010.01)
*H01M 4/66* (2006.01)
*H01M 10/04* (2006.01)
*H01M 10/052* (2010.01)
*H01M 10/0562* (2010.01)
*H01M 6/18* (2006.01)
*H01M 6/40* (2006.01)
*H01M 4/505* (2010.01)
*H01M 4/525* (2010.01)
*H01M 4/58* (2010.01)

(52) U.S. Cl.
CPC ....... *H01M 4/1391* (2013.01); *H01M 4/1397* (2013.01); *H01M 4/66* (2013.01); *H01M 4/661* (2013.01); *H01M 6/186* (2013.01); *H01M 6/188* (2013.01); *H01M 6/40* (2013.01); *H01M 10/0436* (2013.01); *H01M 10/052* (2013.01); *H01M 10/0562* (2013.01); *H01M 4/505* (2013.01); *H01M 4/525* (2013.01); *H01M 4/5825* (2013.01); *H01M 2220/30* (2013.01); *H01M 2300/0068* (2013.01)

(58) Field of Classification Search
CPC .... H01M 4/525; H01M 4/5825; H01M 4/661; H01M 6/186; H01M 6/188; H01M 6/40; H01M 10/0585; H01M 10/0436; H01M 10/052; H01M 10/0562; H01M 2300/0068; H01M 2220/30; Y02E 60/122
See application file for complete search history.

(56) References Cited

U.S. PATENT DOCUMENTS

| | | | |
|---|---|---|---|
| 5,338,625 | A | 8/1994 | Bates et al. |
| 5,445,906 | A | 8/1995 | Hobson et al. |
| 5,512,147 | A | 4/1996 | Bates et al. |
| 5,561,004 | A | 10/1996 | Bates et al. |
| 5,567,210 | A | 10/1996 | Bates et al. |
| 5,569,520 | A | 10/1996 | Bates |
| 5,597,660 | A | 1/1997 | Bates et al. |
| 5,612,152 | A | 3/1997 | Bates |
| 5,654,084 | A | 8/1997 | Egert |
| 5,705,293 | A | 1/1998 | Hobson |
| 6,280,875 | B1 | 8/2001 | Kwak et al. |
| 6,558,836 | B1 | 5/2003 | Whitacre et al. |
| 6,906,436 | B2 | 6/2005 | Jenson et al. |
| 6,982,132 | B1 | 1/2006 | Goldner et al. |
| 6,986,965 | B2 | 1/2006 | Jenson et al. |
| 7,776,478 | B2 | 8/2010 | Klaassen |
| 7,931,989 | B2 | 4/2011 | Klaassen |
| 7,939,205 | B2 | 5/2011 | Klaassen |
| 8,420,252 | B2 | 4/2013 | Shakespeare et al. |
| 2002/0197535 | A1 | 12/2002 | Dudley et al. |
| 2007/0012244 | A1 | 1/2007 | Klaassen |
| 2008/0001577 | A1* | 1/2008 | Sather ................. B60C 23/0411 320/162 |
| 2008/0032200 | A1* | 2/2008 | Bates .................... C01B 21/097 429/322 |
| 2008/0032236 | A1 | 2/2008 | Wallace et al. |
| 2009/0057136 | A1* | 3/2009 | Wang ..................... C23C 14/08 204/192.15 |
| 2009/0208671 | A1 | 8/2009 | Nieh et al. |
| 2009/0214899 | A1 | 8/2009 | Shakespeare et al. |
| 2011/0183183 | A1 | 7/2011 | Grady et al. |
| 2013/0043731 | A1 | 2/2013 | Mullin et al. |

* cited by examiner

THIN FILM BATTERIES COMPRISING A GLASS OR CERAMIC SUBSTRATE

STATEMENT OF PRIORITY

This application claims the benefit of International Application No. PCT/US2013/065045, filed on Oct. 15, 2013, entitled "THIN FILM BATTERIES COMPRISING A GLASS OR CERAMIC SUBSTRATE," which in turn claims priority to U.S. Provisional Application Ser. No. 61/714,004 filed on Oct. 15, 2012, entitled "THIN FILM BATTERIES COMPRISING A GLASS SUBSTRATE," the entireties of said patent applications are incorporated herein by reference.

FIELD OF THE INVENTION

This invention relates to the field of thin-film solid-state energy-storage devices, and more specifically to application configurations of thin-film solid-state batteries

BACKGROUND OF THE INVENTION

Electronics have been incorporated into many portable devices such as computers, mobile phones, tracking systems, scanners, hearing aids, remote sensors, etc. One drawback to such portable devices is the need to include the power supply with the device. Portable devices typically use batteries as power supplies. Batteries must have sufficient capacity to power the device for at least the length of time the device is in use. Sufficient battery capacity can result in a power supply that is disproportionately heavy and/or large compared to the device. Accordingly, smaller and lighter energy storage devices (i.e., power supplies) are desired.

One such type of an energy-storage device is a solid-state, thin-film battery. Examples of thin-film batteries are described in U.S. Pat. Nos. 5,314,765; 5,338,625; 5,445,906; 5,512,147; 5,561,004; 5,567,210; 5,569,520; 5,597,660; 5,612,152; 5,654,084; and 5,705,293, each of which is herein incorporated by reference. U.S. Pat. No. 5,338,625 describes a thin-film battery, especially a thin-film microbattery, and a method for making same having application as a backup or first integrated power source for electronic devices.

Thin film batteries have been made in particular using silicon as a substrate, at least in part because of the reliability of this material and familiarity that manufacturers of small electromechanical devices (including integrated circuit manufacturers) have with silicon wafers. There continues to be a need for devices and methods that facilitate provision of reliable power supplies, particularly in small devices.

SUMMARY OF THE INVENTION

A thin film battery is provided comprising a glass or ceramic substrate having a coefficient of thermal expansion ("CTE") of from about 7 to about 10 ppm/° K, a continuous metal or metal oxide cathode current collector and having a thickness of less than about 3 micrometers, the cathode current collector being superjacent to the glass or ceramic substrate, a cathode material layer comprising lithium transition metal oxides that is a continuous film having a thickness of from about 10 to about 80 micrometers, the cathode material layer being superjacent to the cathode current collector, a LiPON electrolyte layer superjacent to the cathode material layer and having a thickness of from about 0.5 to about 4 micrometers, and an anode current collector with an optional anode material.

Typical solid-state thin film batteries use very thin layers of cathode materials, because thicker such materials tend to form cracks in the material during manufacturing or at an early stage in the desired life cycle of the battery that lead to catastrophic failure of the battery. It has surprisingly been discovered that one may use thick layers of $LiCoO_2$ cathode material when used in combination with a glass or ceramic having a CTE of from about 7 to about 10 ppm/° K, a continuous metal or metal oxide cathode current collector and a LiPON electrolyte layer as presently described. The present solid-state battery construction appears to resist cracking in the cathode material layer, and if cracks do develop they are much less likely to lead to catastrophic failure. While not being bound by theory, it is believed that the interaction between the glass or ceramic substrate, metal or metal oxide cathode current collector and cathode material layer (which are superjacent layers) reduces initial cracking, and the LiPON electrolyte layer in some way acts to "heal" or otherwise retard or prevent catastrophic failure of the battery in cracks occur in the cathode material layer that is in the above described environment.

Avoiding catastrophic failure of solid-state thin film batteries is particularly important. Because of the nature of use of thin film batteries when used in smaller devices or devices that are not configured for easy battery replacement, failure of a solid-state thin film battery has catastrophic effects far beyond the value of the battery itself. Conventional batteries such as coin or button batteries can simply be replaced when damaged. Solid-state thin film batteries in products as described above, however, are usually integrally wired into, for example, a circuit board or in integral combination with one or more devices, such as integrated circuits, power sources, antennas, display devices or combinations of multiple devices. When the solid-state thin film battery fails, replacement of the battery usually is not a commercially viable option. The entire battery and device combination product is rendered useless, representing a loss of far more than the economic value of the solid-state thin film battery alone.

Because the present battery comprises a thick cathode, batteries may be provided having a high energy density that is favorable for use in electronic devices where small size and reliability is highly valued.

BRIEF DESCRIPTION OF THE DRAWINGS

The accompanying drawings, which are incorporated in and constitute a part of this application, illustrate several aspects of the invention and together with a description of the embodiments serve to explain the principles of the invention. A brief description of the drawings is as follows.

DETAILED DESCRIPTION OF PRESENTLY PREFERRED EMBODIMENTS

The embodiments of the present invention described below are not intended to be exhaustive or to limit the invention to the precise forms disclosed in the following detailed description. Rather a purpose of the embodiments chosen and described is so that the appreciation and understanding by others skilled in the art of the principles and practices of the present invention can be facilitated.

Figure 1:
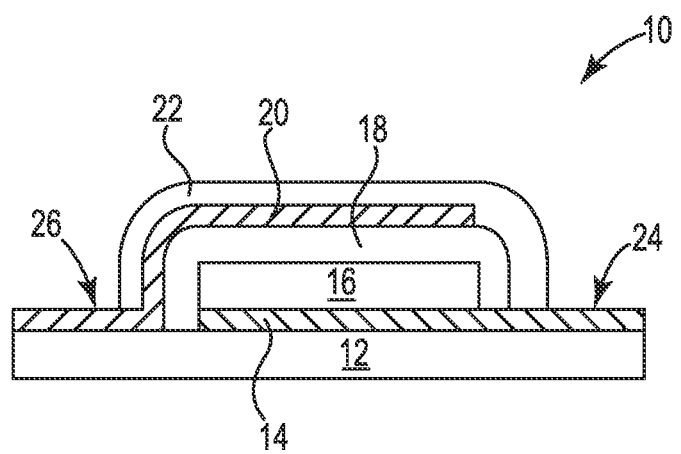
FIG. 1 shows a cross-sectional view of a battery that is an embodiment of the present invention.

Referring to FIG. 1, a thin film battery 10 comprises a glass or ceramic substrate 12 having a cathode current collector 14 that is superjacent to the glass or ceramic substrate 12. A cathode 16 is superjacent to the cathode current collector 14. An electrolyte 18 separates the cathode 16 from anode current collector 20. Encapsulation layer 22 covers the battery cell, preferably configured to provide access to cathode contact 24 and anode contact 26. An anode (not shown) may optionally be provided during battery manufacture as a layer between electrolyte 18 and anode current collector 20. In a preferred embodiment of the present invention, the thin film battery cell is initially constructed without an anode, but with a cathode layer that can act as a source of lithium ions. Upon charging of this thin film battery cell embodiment, metallic lithium is plated between the electrolyte and the anode current collector to form an anode. Alternatively, the anode may be formed by intercalation of the anode material in a layer (not shown) receptive for forming an anode layer. Examples of thin-film batteries are described in U.S. Pat. Nos. 5,314,765; 5,338,625; 5,445,906; 5,512,147; 5,561,004; 5,567,210; 5,569,520; 5,597,660; 5,612,152; 5,654,084; 5,705,293; 6,906,436; 6,986,965; 7,931,989; 7,776,478; and 7,939,205 and US Publication Nos. 2009/0214899 and 2007/0012244 each of which is herein incorporated by reference for all purposes, particularly with respect to the construction methodologies and materials selection of the battery cell components and embodiments of devices comprising thin film batteries. For purposes of the present invention, a "battery" or a "battery cell" will refer to the construction of materials comprising all the elements of a cathode current collector, a cathode, an electrolyte, and anode and an anode current collector, or a construction of materials missing the anode but having materials present such that the missing anode will be generated by plating or intercalation upon charging of the battery.

The battery is constructed on a glass or ceramic substrate having a CTE of from about 7 to about 10 ppm/° K For purposes of the present invention, the coefficient of thermal expansion ("CTE") is determined according to ASTM C372-94(2012) and measured over the temperature range of 25°-800° C. In an embodiment, the glass or ceramic substrate has a CTE of from about 7 to about 8.5 ppm/° K.

In an embodiment, the substrate is a glass substrate prepared from soda-lime-silicate glasses and borosilicate glasses having the desired CTE properties. In a preferred embodiment, the glass is a glass that is tempered to provide increased breaking strength. The glass may be tempered by any appropriate manner, including heat and/or pressure tempering or chemical tempering, such as described in U.S. Pat. No. 4,218,230, which is herein incorporated by reference for all purposes. In an embodiment, the substrate is a ceramic substrate comprising a metal oxide selected from silicon, aluminum, boron, sodium, potassium, calcium, magnesium, zinc, manganese and cobalt oxides. In an embodiment, the ceramic substrate is an amorphous ceramic. In an embodiment, the substrate is an amorphous ceramic comprising greater than about 99% alumina.

For purposes of the present invention, a substrate is defined as a support structure that is not a functional part of the battery cell and is not an insulation protective overcoat. In an embodiment, the glass or ceramic substrate is the only substrate material in the battery. The use of only glass as the substrate advantageously provides a battery assembly that has compatible CTE properties throughout the battery, and also reduces the thickness of the overall battery construction by eliminating unnecessary layers.

In preferred embodiments, the non-active components of the battery construction (i.e. components that do not participate in the battery reaction itself, such as substrate and protective encapsulation) are thin to provide batteries having superior energy densities. Thus, in a preferred embodiment, the glass or ceramic substrate has a thickness of less than 100 micrometers. In another preferred embodiment, the glass or ceramic substrate has a thickness of from about 20 to about 50 micrometers. In a preferred embodiment, the battery is provided with a protective encapsulation having a thickness of less than 100 micrometers, or preferably a thickness of from about 20 to about 50 micrometers.

The battery comprises a continuous metal or metal oxide cathode current collector superjacent to the glass or ceramic substrate and having a thickness of less than about 3 micrometers. In embodiments of the present invention, the metal or metal oxide cathode current collector has a thickness of about 0.1 to 2 micrometers, or preferably about 0.5 to 1 micrometers. In embodiments, the metal or metal oxide cathode current collector is selected from the group consisting of copper, aluminum, nickel, iron, gold, silver, platinum, molybdenum, titanium, manganese, indium, metal alloys, oxides and combinations thereof.

In an embodiment, the metal or metal oxide cathode current collector metal has a CTE of from about 6 to about 12 ppm/° K. In another embodiment, the metal or metal oxide cathode current collector metal or has a CTE of from about 7 to about 10 ppm/° K. It has been found that embodiments where the cathode current collector is well matched to that of the substrate and also to the reported value of the CTE of the cathode material itself provide manufacturing and performance advantages.

In some embodiments, a conductive glassy material, such as indium tin oxide is used as a cathode current collector. Indium tin oxide has an advantage of not only being conductive, but also has a CTE similar to that of the glass or ceramic substrate and the lithium metal oxide cathode. In an embodiment, the metal or metal oxide cathode current collector metal is platinum.

In an embodiment, the metal or metal oxide cathode current collector metal is aluminum. While aluminum has a relatively low melting temperature, it is believed to provide advantageous performance in tying the cathode material layer to the substrate in certain embodiments.

The cathode material layer as used in the present invention is a continuous film, as contrasted to powder/screen printed cathode materials. This type of cathode material provides advantages for solid-state batteries (i.e. batteries that use a solid LiPON electrolyte layer) because they provide a uniform surface for the solid electrolyte. Such film cathode materials are challenging to manufacture in relatively larger layer thicknesses as contemplated herein. The present invention as a whole therefore affords significant manufacturing and performance benefits.

The present invention utilizes a thick cathode material layer as compared to conventional solid-state thin film battery constructions, i.e. a thickness of from about 10 to about 80 micrometers. The present cathode material layer comprises at least one lithium transition metal oxides and is superjacent to the cathode current collector. In preferred embodiments, the cathode comprises lithium transition metal oxides selected from the group consisting of $LiCoO_2$, LiFePO$_4$, LiMnO$_2$, LiNi$_{1/3}$Mn$_{1/3}$Co$_{1/3}$O$_2$ and mixtures thereof. In a particularly preferred embodiment, the only lithium transition metal oxide in the cathode is LiCoO$_2$. In embodiments of the present invention, the cathode material layer has a thickness of from about 15 to about 50 micrometers.

In an embodiment, the cathode material layer has been annealed to a temperature of from about 500° C. to about 800° C. In another embodiment, the cathode material layer has been annealed to a temperature of from about 650° C. to about 750° C.

A LiPON electrolyte layer is provided that is superjacent to the cathode material layer and having a thickness of from about 0.5 to about 4 micrometers. As used herein, LiPON refers generally to lithium phosphorus oxynitride materials. One example is Li$_3$PO$_4$N. Other examples incorporate higher ratios of nitrogen in order to increase lithium ion mobility across the electrolyte.

In an embodiment of the present invention, multiple electrolyte layers may be provided in addition to the above-described LiPON layer. An example of a preferred multi-layered electrolyte construction is described in U.S. Pat. No. 7,776,478 entitled "THIN-FILM BATTERIES WITH SOFT AND HARD ELECTROLYTE LAYERS AND METHOD," which is hereby incorporated by reference in total for all purposes.

An anode current collector is provided, and may be made from a conductive material such as copper, titanium, aluminum, nickel, iron, gold, silver, platinum, molybdenum, manganese, metal alloys, conductive ceramics, conductive semiconductors such as heavily doped polycrystalline silicon, and the like. In embodiments of the present invention, the anode current collector has a thickness of about 0.5 to 3 micrometers.

As noted above, in some embodiments the anode is provided during the manufacturing process and prior to initial charge as a manufactured layer, e.g. by metal deposition. The anode may be made from metals such as, for example, nickel, aluminum, silicon, tin, lithium and/or alloys thereof. In embodiments of the present invention, the anode has a thickness of about 1 to 3 micrometers.

In a preferred embodiment of the present invention, the anode is not initially provided as part of the battery construction as manufactured, but rather is generated only upon initial charge of the battery. Because the cathode material comprises a lithium-containing compound, the anode may be formed as an active anode that is a layer of lithium metal after assembly of the battery, e.g., by the first charging of the battery. This is sometimes called a "Li-free" design, and affords the advantage of surviving high-temperature (>180° C.) module assembly and packaging procedures because metallic Li is not yet present (and does not melt) prior to the initial charge. In other embodiments, an anode intercalation structure is provided, e.g. by providing a graphite layer, and lithium ions are intercalated into the anode intercalation structure to form a functional anode.

The battery preferably is provided with an encapsulation layer that completely envelops the battery cell, providing only access to contacts to the anode and cathode current collectors for operation of the battery.

The encapsulation is desirable in order to protect the battery materials from exposure to water vapor, oxygen, and other environmental contaminants. Lithium in particular reacts readily with other elements and compounds. Because thin film batter components in are sensitive to exposure to environmental elements, the battery construction should be isolated from the outside world after production of the battery. The extra protection afforded by the construction of the present battery, and in particular in combination with encapsulation is very advantageous. The final encapsulation material preferably is an organic material as a silicone, polyimide, epoxy or other such polymer. In an embodiment of the present invention, encapsulating material thickness is about 0.5 to about 10 micrometers. In another embodiment, the encapsulating material thickness is about 8 to about 10 micrometers. In an embodiment of the present invention, a final outer layer is silicon nitride, at a thickness of about 0.5 to 1 micrometers, which provides additional hermetic protection and is compatible with integrated circuit packaging materials. This final layer also serves as something of a physical barrier to abrasion and handling damage.

In an embodiment of the present invention, batteries are provided with one or more layers of the same or different materials that are flexible in order to accommodate dimensional changes that may occur in the battery during charge/discharge cycles. In an embodiment, a thin film solid-state battery is provided with a flexible layer having a thickness of about 0.5 to about 10 micrometers and made from a material having a Shore A hardness of from about 10 to about 100. In an embodiment, a thin film solid-state battery is provided with a flexible layer having a thickness of about 0.5 to about 10 micrometers and made from a material having a Shore OO hardness of from about 10 to about 90.

In an embodiment, a thin film solid-state battery is provided with a flexible layer having a thickness of about 0.5 to about 10 micrometers and made from a material having a percent elongation at yield of at least 30, and in an embodiment between about 30 and 100. Percent elongation at yield is determined by testing according to ASTM D638-02a at a speed of testing of 50 mm/minute.

The provision of a flexible layer is particularly advantageous for embodiment having a relatively thick cathode layer as presently described (i.e. a cathode material layers that are continuous films having a thickness of from about 10 to about 80 micrometers). It is noted that thicker cathode film layers will experience localized dimension changes that may adversely affect rigid battery constructions.

In an embodiment, the material for providing a flexible layer is a photodefinable polymer material. In an embodiment, the material for providing a flexible layer is a photodefinable polyimide material. In an embodiment, the material for providing a flexible layer is a silicone polymer material, such as HIPEC® Q3-6646 Semiconductor Protective Coating from Dow Corning.

In some embodiments, the battery of the invention includes a getter layer. A getter layer is generally described in U.S. Pat. No. 5,654,084 and is a layer that is intended to react with or adsorb at least one component of a deleterious substance in the environment to assist in preventing penetration of the barrier layer by the deleterious substance. For example, a layer containing titanium, tantalum, phosphorous, barium, erbium, rubidium, a titanium-zirconium alloy, cobalt oxide, carbon, hydrazine, sodium sulfite, or the like can be used to reduce transport of water or oxygen through protective layers of the battery In an embodiment of the present invention, the battery has a foot print area of from about 12 cm$^2$ to about 1000 cm$^2$. In an embodiment, the battery for use in such applications may, for example have a foot print area of from about 12 cm$^2$ to about 50 cm$^2$. In an embodiment, somewhat smaller batteries are desirable. In such embodiments, preferably, the battery has a footprint area of no more than about 50 cm$^2$.

In another preferred embodiment, smaller batteries are desirable. In such embodiments, preferably, the battery has a footprint area of no more than about 13 cm$^2$. In other embodiments the battery has a footprint area of no more than about 12 cm$^2$, 11 cm$^2$, 10 cm$^2$, 9 cm$^2$, 8 cm$^2$, 7 cm$^2$, 6 cm$^2$, 5 cm$^2$, cm$^2$, 3 cm$^2$, 2 cm$^2$, or 1 cm$^2$. In an embodiment, the battery has minimum footprint about 0.025 cm$^2$ and a footprint area of no more than about 13 cm$^2$, 12 cm$^2$, 11 cm$^2$, 10 cm$^2$, 9 cm$^2$, 8 cm$^2$, 7 cm$^2$, 6 cm$^2$, 5 cm$^2$, cm$^2$, 3 cm$^2$, 2 cm$^2$, or 1 cm$^2$.

Preferably, the battery has a total thickness, not including substrate and outer protective layers (i.e. layers not electrically connected to the battery cell), not exceeding about 200 micrometers, more preferably not exceeding 120 micrometers, yet more preferably not exceeding 100 micrometer and most preferably not exceeding 50 micrometers.

In a preferred embodiment, multiple batteries are electrically connected to each other in a rechargeable multi-cell battery array, wherein of at least two thin film battery cells electrically connected together in parallel to provide power as a single battery power source. The array preferably further comprises testing logic to determine if a battery cell has a battery voltage that is more than a predetermined percentage different from the voltage of the overall battery cell array or has an absolute voltage below a predetermined cutoff threshold, and logic to disconnect any battery cell from the battery cell array if the battery cell has a battery cell voltage that is more than the predetermined percentage different from the voltage of the overall battery cell array or has an absolute voltage below a predetermined cutoff threshold. In such an embodiment, a single failure that would destroy a single battery cell will not destroy functionality of the battery cell array of the present invention, because the single failure will only affect one cell, leaving a plurality of cells still operational. Disconnecting the thus identified battery cell operates to protect the rest of the battery cell array from deep discharge. By providing an array having at least two cells, and preferably at least four cells, a level of redundancy in power supply can be provided so that even if there are multiple failures, the overall battery cell construction is still capable of producing operational levels of power.

Further description of systems for charging and/or disconnecting batteries in an array are described in U.S. patent application Ser. No. 13/587,469, filed Aug. 16, 2012, entitled "MULTI-CELL THIN FILM MICROBATTERY ARRAY," the disclosure of which is incorporated herein by reference for all purposes.

A multi-battery array may be configured in a side-by-side configuration, so that the batteries are in a generally planar orientation extending in the XY direction. Such generally planar arrays may be manufactured on a single substrate using processing techniques common in semiconductor wafer manufacturing. Sub-groups of battery arrays may be separated from larger manufacturing lots using techniques as described below. The battery array may be laid out in a generally square array. Other microbattery cell configurations, including rectangular, triangular, pentagonal, circular, or other shape as will now be understood. Likewise, the individual battery cells in the array may be generally square in shape, or may alternatively have a rectangular, triangular, pentagonal, circular, or other shape.

Battery cell arrays may, for example, have a foot print area of from about 12 cm$^2$ to about 1000 cm$^2$. In an embodiment, the battery cell arrays may, for example, have a foot print area of from about 12 cm$^2$ to about 50 cm$^2$. In an embodiment, somewhat smaller battery cell arrays are desirable. In such embodiments, preferably, the battery cell array has a footprint area of no more than about 50 cm$^2$.

In another preferred embodiment, smaller battery cell arrays are desirable. In such embodiments, preferably, the battery cell array has a footprint area of no more than about 13 cm$^2$. In other embodiments the battery cell array has a footprint area of no more than about 12 cm$^2$, 11 cm$^2$, 10 cm$^2$, 9 cm$^2$, 8 cm$^2$, 7 cm$^2$, 6 cm$^2$, 5 cm$^2$, cm$^2$, 3 cm$^2$, 2 cm$^2$, or 1 cm$^2$. In an embodiment, the battery cell array has minimum footprint about 0.025 cm$^2$ and a footprint area of no more than about 13 cm$^2$, 12 cm$^2$, 11 cm$^2$, 10 cm$^2$, 9 cm$^2$, 8 cm$^2$, 7 cm$^2$, 6 cm$^2$, 5 cm$^2$, cm$^2$, 3 cm$^2$, 2 cm$^2$, or 1 cm$^2$.

Additionally, the array may be arranged in a vertical or stacked configuration of individual battery cells, or in a combination of a horizontal and vertical array of battery cells. Arrays of stacked batteries are described in US Patent Application Publication No. 2011/0183183 entitled "BATTERY ARRAYS, CONSTRUCTIONS AND METHOD," which is incorporated herein by reference. As noted above, the individual batteries of the array may be in a shape other than square.

Figure 2:
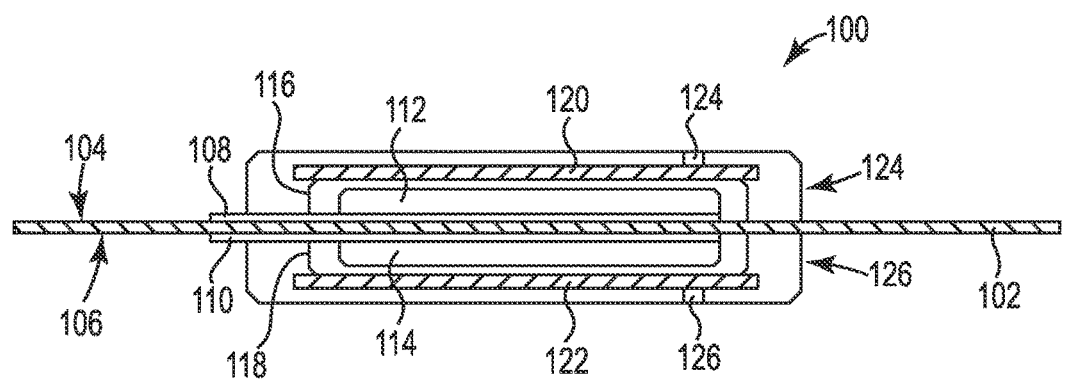
FIG. 2 shows a cross-sectional view of a two-sided battery that is an embodiment of the present invention.

FIG. 2 shows an embodiment of the present invention that is a two-battery cell array having a cell present on both major surfaces of the glass or ceramic substrate. Specifically, a two sided glass or ceramic substrate battery array 100 is constructed from glass or ceramic substrate 102 having first major surface 104 and second major surface 106. First cathode current collector 108 is superjacent to first major surface 104, and second cathode current collector 108 is superjacent to second major surface 106. First cathode 112 is superjacent to first cathode current collector 108, and second cathode 114 is superjacent to second cathode current collector 110. LiPON electrolyte 116 lies between and separates first cathode 112 from first anode current collector 120, and LiPON electrolyte 118 lies between and separates second cathode 114 from second anode current collector 122, Encapsulation materials 124 and 126 protect the respective battery cell constructions. Access to the cathode current collectors for attaching electrical connections to the battery may be obtained at the portions extending beyond encapsulation materials 124 and 126. Access to the anode current collectors 120 and 122 for attaching electrical connections to the battery may be obtained at vias 124 and 126.

In this embodiment, the effective thickness of the cathode material is doubled relative to the substrate; with concomitant increase in capacity while any additional substrate thickness is avoided. This construction improves energy density of the battery as compared to single side constructions. In addition, any mismatch of substrate/cathode materials properties can be offset by symmetry.

Figure 4:
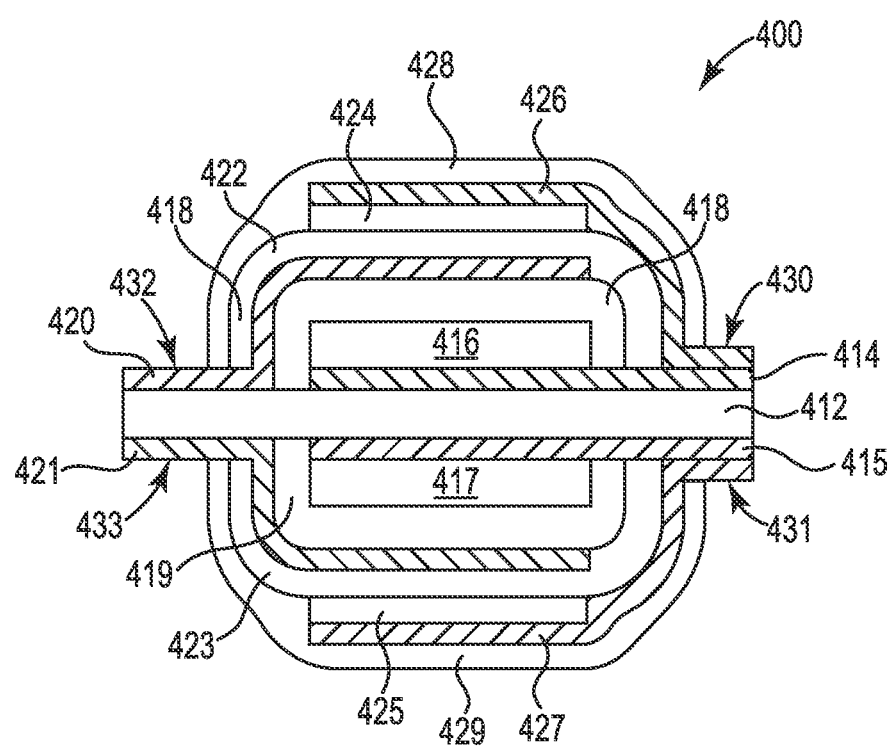
FIG. 4 shows an embodiment of the present invention, wherein a single anode current collector is used to provide a double battery cell associated with a single glass or ceramic substrate.

FIG. 4 shows another embodiment of the present invention, wherein a single anode current collector is used to provide a double battery cell associated with a single glass or ceramic substrate. As shown in FIG. 4, this double battery cell is replicated on the second major surface of the glass or ceramic substrate, so that a single glass or ceramic substrate is used to support four battery cells. In embodiments, the double battery cell is provided on only one side of the glass or ceramic substrate. In other embodiments, a four-cell configuration as shown is provided in a multiple array either in a horizontal configuration, a vertical configuration, or a combination thereof.

Turning now to a detailed description of the embodiment of FIG. 4, a thin film battery 400 comprises a glass or ceramic substrate 412 having cathode current collectors 414 and 415 that is superjacent to both major surfaces of the glass or ceramic substrate 412. Cathodes 416 and 417 are superjacent to the cathode current collectors 414 and 415. Electrolytes 418 and 419 separate the cathodes 416 and 417 from anode current collectors 420 and 421. Secondary electrolyte layers 422 and 423 separate anode current collectors 420 and 421 from secondary cathodes 424 and 425. Secondary cathode current collectors 426 and 427 are superjacent to cathodes 424 and 425.

Encapsulation layers 428 and 429 cover the battery cells, preferably configured to provide access to cathode contacts 430 and 431 and anode contacts 432 and 433.

Anodes (not shown) may optionally be provided during battery manufacture as layers between electrolyte 418 and anode current collectors 420 and 421, and additionally between anode current collectors 420 and 421 and secondary electrolyte layers 422 and 423. In a preferred embodiment of the present invention, the thin film battery cell is initially constructed without an anode, and cathodes 416, 417, and secondary cathodes 424 and 425 act as a source of lithium ions. Upon charging of this thin film battery cell embodiment, metallic lithium is plated between the respective electrolytes and anode current collectors to form four anodes in the embodiment as shown. Alternatively, the anodes may be formed by intercalation of the anode material in a layer (not shown) receptive for forming an anode layer.

Figure 3:
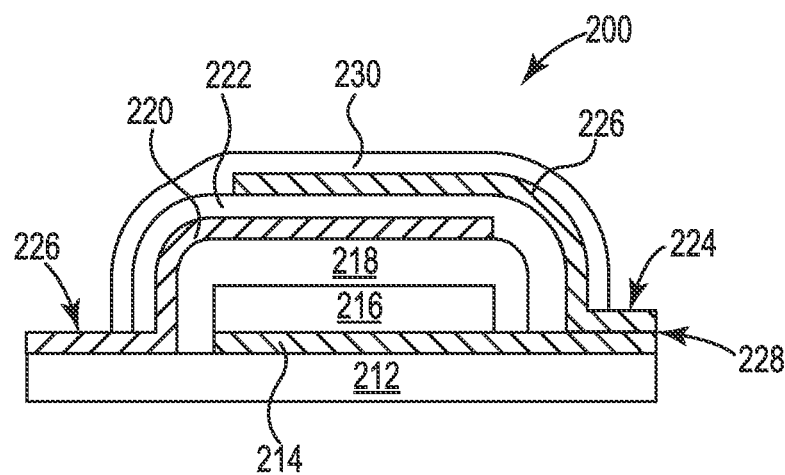
FIG. 3 shows a cross-sectional view of a battery that is an embodiment of the present invention.

In an embodiment of the present invention, the battery is constructed to provide additional protection from the elements by providing a protective metal layer that overlays the cathode material, electrolyte and a portion of the anode current collector in order to define an enclosed area between the protective metal layer and the cathode current collector. Specifically, FIG. 3 shows a thin film battery 200 comprising a glass or ceramic substrate 212 having a cathode current collector 214 that is superjacent to the glass or ceramic substrate 212. A cathode 216 is superjacent to the cathode current collector 214. An electrolyte 218 separates the cathode 216 from anode current collector 220. Encapsulation layer 222 covers the battery cell, preferably configured to provide access to cathode contact 224 and anode contact 226. An anode (not shown) may optionally be provided during manufacture battery manufacture as a layer between electrolyte 218 and anode current collector 220. A protective metal layer 226 is provided atop encapsulation layer 222 and is sealed with a metal-to-metal seal with cathode current collector 214 at junction 228. This metal edge seal provides superior protection of the battery to the elements, by providing a complete metal-to-metal boundary seal around the entire battery perimeter. Second encapsulation layer 230 covers the battery cell, preferably configured to provide access to cathode contact 224 and anode contact 226. This layout prevents adverse environmental exposure of edges of adjacent metal and non-metal layers that would provide a direct lateral pathway to sensitive components of the battery construction along a metal/non-metal interface. Similar configurations suitable for use in the present invention are described in US Patent Application Publication No. 2009/0214899, entitled "BATTERY LAYOUT INCORPORATING FULL METAL EDGE SEAL," the disclosure of which is incorporated herein by reference for all purposes.

As will now be apparent to the artisan, all embodiments of batteries of the present invention may be electrically connected to devices in need of battery power by use of contact pads, vias, other suitable connection structures, or combinations thereof. Attachments may be made by any suitable connective system, such as wirebond, solder, connection with conductive epoxy, etc.

Batteries of the present invention may be designed to meet particular power requirements for use in various applications. In an embodiment, individual batteries are provided having a lifecycle capacity of from about 0.5 mAh to about 20 mAh. In an embodiment, a multi-battery array provides a lifecycle capacity of from about 0.5 mAh to about 500 mAh. In an embodiment, a multi-battery array provides a lifecycle capacity of from about 5 mAh to about 100 mAh.

Batteries in accordance with the present invention may be made by manufacturing processes suitable for the size of the battery. Thus, very large batteries may be made by material deposition and sputtering techniques using screen techniques that will not be apparent to the skilled artisan. In a preferred embodiment, batteries may be made using photolithography and etching techniques, such as described in US Patent Publication No. US 2008/0032236 entitled "METHOD AND APPARATUS FOR SOLID-STATE MICROBATTERY PHOTOLITHOGRAPHIC MANUFACTURE, SINGULATION AND PASSIVATION," which is incorporated herein by reference for all purposes.

Additionally, batteries may be prepared by use of laser ablation to remove material, leaving the desired pattern of battery material that is then coated with subsequent layers. In an embodiment, batteries are prepared by a combination of two or more of screen techniques, photolithography and laser ablation. It is specifically contemplated that a plurality of battery cells may be prepared on a single substrate, with individual batteries or sub-groups of a battery array separated from the manufacturing lot by a singulation technique such as laser ablation, etching and/or dicing-saw techniques.

Batteries of the present invention may be used to provide power to a device in need of battery power.

In an embodiment of the invention, the device to be powered is an integrated circuit or a plurality of integrated circuits. The circuit may optionally include one or more of a processor, a memory, and an input device, an output device, and an antenna. In such an application, the battery may be very small.

In an embodiment of the invention, the device to be powered is an electronic apparatus such as a music player, telephone, electronic reader, computer tablet, or portable computer. The nature of the device will dictate size of the battery. In an embodiment, the device has a display screen and the battery is sized with XY dimensions approximating the display screen size. Batteries of the present invention may provide superior space efficiencies by providing high energy densities in any shape as dictated by device design requirement.

All patents, patent applications (including provisional applications), and publications cited herein are incorporated by reference as if individually incorporated for all purposes. Unless otherwise indicated, all parts and percentages are by weight and all molecular weights are weight average molecular weights. The foregoing detailed description has been given for clarity of understanding only. No unnecessary limitations are to be understood therefrom. The invention is not limited to the exact details shown and described, for variations obvious to one skilled in the art will be included within the invention defined by the claims.

What is claimed is:

1. A thin film battery comprising:
   a) a glass substrate having a CTE of from about 7 to about 10 ppm/° K;
   b) a continuous metal or metal oxide cathode current collector having a thickness of less than about 3 micrometers, the cathode current collector being superjacent to the glass substrate;
   c) a cathode material layer comprising lithium transition metal oxides that is a continuous film having a thickness of from about 10 to about 80 micrometers, the cathode material layer being superjacent to the cathode current collector;

d) a LiPON electrolyte layer having a thickness of from about 0.5 to about 4 micrometers, the LiPON electrolyte layer being superjacent to the cathode material layer micrometer; and e) an anode current collector.

2. The thin film battery of claim 1, wherein the glass substrate is the only substrate material in the battery.

3. The thin film battery of claim 1, wherein the glass substrate has a thickness of from about 20 to about 50 micrometers.

4. The thin film battery of claim 1, wherein the cathode material layer comprises lithium transition metal oxides selected from the group consisting of $LiCoO_2$, $LiFePO_4$, $LiMnO_2$, $LiNi_{1/3}Mn_{1/3}CO_{1/3}O_2$ and mixtures thereof.

5. The thin film battery of claim 1, wherein the only lithium transition metal oxide in the cathode material layer is $LiCoO_2$.

6. The thin film battery of claim 1, wherein the cathode material layer has a thickness of from about 15 to about 50 micrometers.

7. The thin film battery of claim 1, wherein the cathode material layer has been annealed to a temperature of from about 500° C. to about 800° C.

8. The thin film battery of claim 1, wherein the cathode material layer has been annealed to a temperature of from about 650° C. to about 750° C.

9. The thin film battery of claim 1, wherein the metal or metal oxide cathode current collector is selected from the group consisting of copper, aluminum, nickel, iron, gold, silver, platinum, molybdenum, titanium, manganese, indium, metal alloys, oxides and combinations thereof.

10. The thin film battery of claim 1, wherein the metal or metal oxide cathode current collector metal or has a CTE of from about 6 to about 12 ppm/° K.

11. The thin film battery of claim 1, wherein the metal or metal oxide cathode current collector metal or has a CTE of from about 7 to about 10 ppm/° K.

12. The thin film battery of claim 1, wherein the metal or metal oxide cathode current collector is indium tin oxide.

13. The thin film battery of claim 1, wherein the metal or metal oxide cathode current collector is platinum.

14. The thin film battery of claim 1, wherein the metal or metal oxide cathode current collector is aluminum.

15. The thin film battery of claim 1, wherein the battery further comprises an anode.

16. The thin film battery of claim 1, wherein the glass substrate has two major surfaces, and wherein a battery cell array is present on both major surfaces of the glass substrate.

17. The thin film battery of claim 16, wherein the battery cell array provides a lifecycle capacity of from about 0.5 mAh to about 500 mAh.

18. The thin film battery of claim 16, wherein the battery cell array provides a lifecycle capacity of from about 5 mAh to about 100 mAh.

19. The thin film battery of claim 1, wherein the glass substrate comprises a metal oxide selected from silicon, aluminum, boron, sodium, potassium, calcium, magnesium, zinc, manganese and cobalt oxides.

20. The thin film battery of claim 1, wherein the battery provides a lifecycle capacity of from about 0.5 mAh to about 20 mAh.

* * * * *